J. J. Patton,
Corn Planter.
No. 93,116.            Patented July 27, 1869.
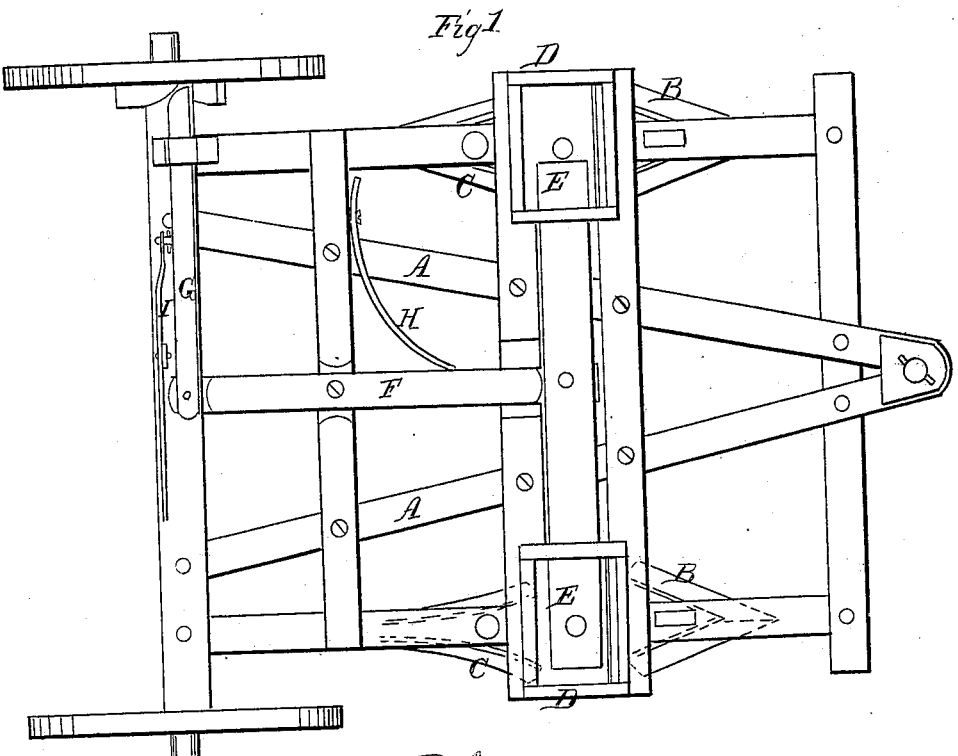
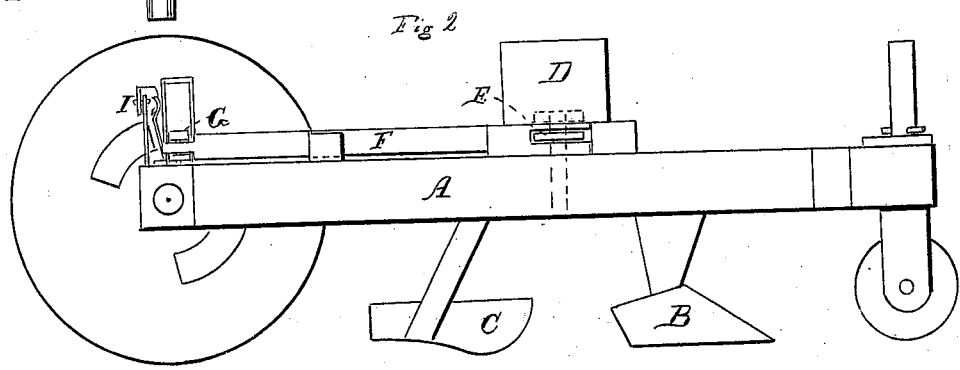
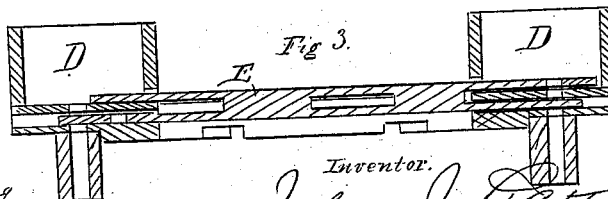
Witnesses         Inventor.

United States Patent Office.

JOHN I. PATTON, OF TIFFIN, OHIO.

Letters Patent No. 93,116, dated July 27, 1869.

---

IMPROVEMENT IN CORN-PLANTER.

---

The Schedule referred to in these Letters Patent and making part of the same.

---

*To all whom it may concern:*

Be it known that I, JOHN I. PATTON, of Tiffin, in the county of Seneca, and in the State of Ohio, have invented certain new and useful Improvements in Corn-Planter; and do hereby declare that the following is a full, clear, and exact description thereof, reference being had to the accompanying drawings, and to the letters of reference marked thereon.

The nature of my invention consists in the construction and general arrangement of a "corn-planter," as will be hereinafter fully set forth.

In order to enable others skilled in the art to which my invention appertains, to make and use the same, I will now proceed to describe its construction and operation, referring to the annexed drawings, which form a part of this specification, and in which—

Figure 1 represents a plan view of my planter.

Figure 2 is a side view of the same, with one wheel removed.

Figure 3 is a section view of the seed-boxes.

Letter A represents the frame of my machine, which is supported upon two ordinary driving-wheels in the rear, and up a small guiding one in the front.

Attached to each side of the frame A are the plowshares B, which are placed near the front end, immediately in front of where the grain drops from the grain-boxes.

At a short distance behind these two plows are two scrapers, C, which follow after and cover the corn as rapidly as dropped.

Upon each side of the frame there is placed a seed-box, D, into which the grain is placed preparatory to being planted.

In the bottom of each of these boxes there is placed a perforated valve, or slide, E, for measuring the number of grains to each hill. This slide is so formed that the small holes in its ends, as seen in fig. 1, will contain a certain number of grains, and, in sliding backward and forward, moves them over to a second opening, through the frame, where they fall through, on to the ground, in the furrow formed by the plowshares.

Pivoted to the middle of this slide E is the lever F, by means of which the slide is operated. This lever is secured, near its middle, to the frame of the machine, and has its other end secured to the vibrating bar G.

Attached to the side of one of the wheels there are two cams, which operate the vibrating-bar, whereby motion is communicated to the slide E, through the lever F.

To one of the cross-pieces of the frame there is attached a spring, H, which causes the lever to spring back into place again, after being moved to one side by the bar.

As the machine now is, it would be impossible to back it, as the cams are so formed that they catch against the end of the bar G. In order to obviate this difficulty, the lever I has been provided, by means of which this bar can be raised high enough, so as to no longer catch on the cams, either in moving forward or backward, thus enabling it to be moved in either direction.

It will be noticed that the slide E is slotted to a considerable distance at each end, the under end being shorter than the upper one.

The opening in the slide in the boxes will contain only enough corn for one hill, and as soon as the slide is moved far enough to one side, the opening in the slide drops the grain into a corresponding opening in the frame underneath, at the same time cutting off the corn from above.

Having thus described my invention,

What I claim, and desire to secure by Letters Patent, is—

1. The combination of the slide E, lever F, and spring H, all constructed and arranged to operate substantially in the manner and for the purposes herein set forth.

2. The combination and arrangement of the seed-boxes D D, slide E, plows B B, scrapers C, levers F and I, vibrating bar G, and the cams upon the driving-wheel, all constructed and operating substantially in the manner and for the purposes set forth.

In testimony that I claim the foregoing, I have hereunto set my hand, this 27th day of February, 1869.

JOHN I. PATTON.

Witnesses:
GEO. S. YINGLING,
A. C. BARBER.